Figure 3:

(No Model.) 2 Sheets—Sheet 1.
G. GOG, Sr.
SLED.
No. 389,218. Patented Sept. 11, 1888.
Fig. 1.
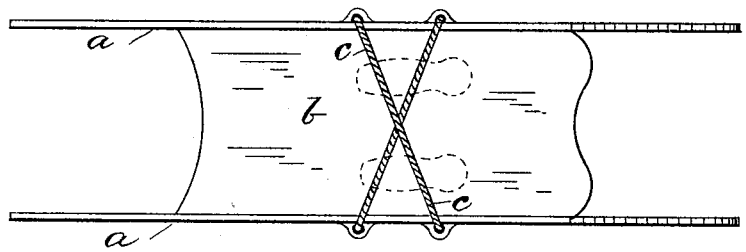
Fig. 2.
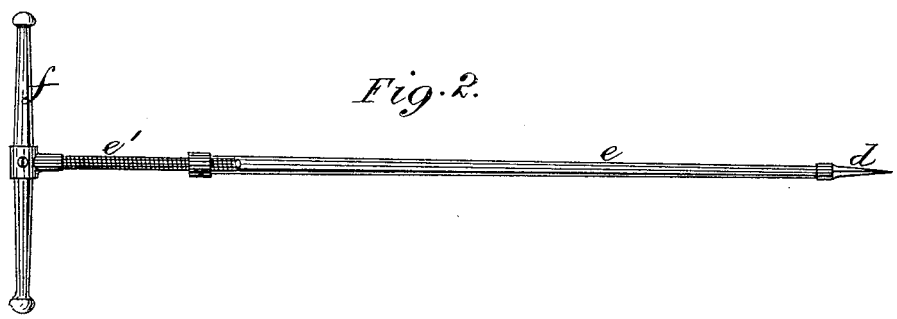
Fig. 5.         Fig. 4.
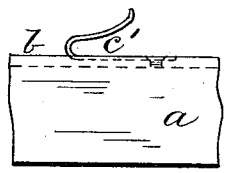  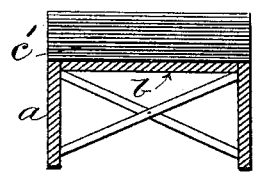
WITNESSES,
W. Byrne.
S. L. Schrader.
INVENTOR.
George Gog Sr.
Paul Bakewell,
his attorney.

(No Model.) 2 Sheets—Sheet 2.

G. GOG, Sr.
SLED.

No. 389,218. Patented Sept. 11, 1888.

Witnesses,

Inventor,
George Gog Sr
by Paul Bakewell,
his attorney.

UNITED STATES PATENT OFFICE.

GEORGE GOG, SR., OF ST. LOUIS, MISSOURI.

SLED.

SPECIFICATION forming part of Letters Patent No. 389,218, dated September 11, 1888.

Application filed April 17, 1888. Serial No. 270,893. (No model.)

*To all whom it may concern:*

Be it known that I, GEORGE GOG, Sr., a citizen of the United States, residing at the city of St. Louis, in the State of Missouri, have invented an Improved Means of Propelling Sleds, of which the following is a specification.

My invention relates to novel means of propelling sleds, and has for its object to provide a source of healthful exercise and recreation, and to enable a person to readily transport himself for considerable distances on the ice.

It consists, first, in the application to the platform of a sled of crossed ropes, chains, or cords, or of a specially-shaped stirrup-piece, for affording a hold and purchase to the feet of the rider, and, secondly, in the combination therewith of an adjustable prod or spear, which on being forced into the ice at the rear of the sled by the rider propels the sled in the desired direction.

On the accompanying drawings, Figure 1 represents the plan of a sled having the first part of my invention applied thereto; Fig. 2, a longitudinal view of the prod or spear, combined with the first part of my invention; Fig. 3, a side view in perspective of the sled, showing the mode of operating my invention; and Figs. 4 and 5, cross-section and part side elevation, respectively, of a modified form of the first part of my invention, like letters of reference denoting like parts in the respective figures.

*a* represents a sled having the platform *b*, across which are arranged ropes, chains, or cords *c*, preferably two in number, which cross each other crosswise over the middle of the platform *b*, their adjacent ends being secured in any suitable manner to the respective sides of the sled *a*, so that the cords *c* are sufficiently taut to produce a downward holding pressure on a person's feet when interposed between them and the platform *b*.

*d* represents a prod or spear carried by the shaft *e*, which may be made of ash or other suitable material, and provided with a screwed adjustable portion, *e'*, which works through a nut on the end of the shaft *e*, and is provided at its outer end with a cross-handle, *f*.

The rider, standing on the platform *b* of the sled *a*, inserts his feet beneath the crossed ropes *c*, and, taking hold of the handle *f* of the prod or spear *d*, passes the latter, with its shaft *e*, between his legs, as shown in Fig. 3, when, by forcing the spear *d* into the ice at the rear of the sled *a* and pressing backward on the handle *f*, the sled *a* is propelled in a forward direction, the ropes *c* meanwhile serving as the fulcrum or purchase to the propelling force, and subsequently, on the withdrawal of the spear *d* for a fresh stroke, as a holder or means of preserving the balance of the rider in the platform *b*. By means of the screwed portion *e'* to the shaft *e* the length of the latter may be adjusted to the varying heights of the riders or the lengths of strokes desired; or in lieu of ropes *c*, I may use a hook-shaped stirrup-bar, *c'*, extending across and secured to the platform *b* of the sled *a*, as shown in Figs. 4 and 5, the feet of the rider being inserted and butting therein.

I claim as my invention—

1. In a sled, *a*, the combination of platform *b*, with ropes, chains, or cords *c*, crossing each other crosswise over the platform *b*, substantially as shown, and for the purpose described.

2. In a spear for propelling sleds, the combination of the shaft *e*, with prod *d* at its lower end, and provided at its upper end with a screwed adjustable portion, *e'*, having handle *f*, and working through a nut at the upper end of the shaft, substantially as described, and for the purpose specified.

In testimony whereof I affix my signature, in presence of two witnesses, this 11th day of April, A. D. 1888.

GEO. GOG, SR.

Witnesses:
S. P. SCHRADER,
PAUL BAKEWELL.